Figure 1:
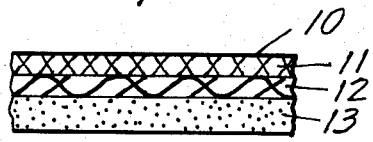

INVENTOR
JAMES E. JOHNSTON
BY
Carpenter, Abbott, Coulter & Kinney
ATTORNEYS

United States Patent Office 3,114,840
Patented Dec. 17, 1963

3,114,840
HEAT SHIELDING, DRAPEABLE CURTAIN MATERIAL
James E. Johnston, Arcadia, Calif., assignor to Minnesota Mining and Manufacturing Company, St. Paul, Minn., a corporation of Delaware
Filed Nov. 23, 1959, Ser. No. 854,683
10 Claims. (Cl. 250—108)

This invention relates to a light-weight flexible thermal-barrier curtain material containing a built-in heat-sink. The curtain material is especially useful as a shield against brief exposure to extremely intense radiation. In practical tests, thermal curtains of the invention have served as protective shields to mask out incident intense heat fluxes from radiant heat sources at 5000° F. or more. No other light-weight drapeable curtain material is known to afford such protection.

In attacking the problem of preparing a thermal-barrier curtain material effective to shield against intense incident radiation from sources on the order of 5000° F. or more, one would expect that the bulk of the thermal protecting material should be rather substantial inasmuch as increased thermal protection is generally gained proportionately to increases in the mass of the material utilized for protection. But the expedient of increasing the mass or bulk of a shielding material to gain thermal protection detracts from the attainment of portability, flexibility and convenient handling in practical use applications. Contrary to the type of article one would expect to fabricate to obtain adequate protection against extremely intense thermal energy, I have found that very thin laminated structural materials may be formed which exhibit required thermal shielding characteristics and which also exhibit flexibility, drapeability, durability, lightness in weight, and other necessary properties for handling in practical use applications. It is clear that thermal shielding for aircraft use must be accomplished at minimal weights; and cloth-like drapeability is essential for convenient storage and handling. The thermal curtain of this invention satisfies such requirements.

Efficient reflectors of radiant energy are, of course, known. The incorporation of such a property into a composite flexible and drapeable fabric article has also been accomplished, see U.S. Patent No. 2,703,772 to Keithly. In the Keithly structure, an extremely thin, visibly-opaque, vapor-deposited metal film is bonded to a fabric backing to provide a composite light-weight drapeable article of efficient radiant energy reflection. Nevertheless, upon exposure of a structure as in the Keithly patent to concentrated extremely intense incident heat fluxes such as from focused carbon arcs, a rapid build-up of temperature occurs within the structure and deterioration of the structure, with loss of thermal protection, occurs within seconds after exposure. The deterioration is so rapid that the fabric fails to serve effectively as a protective shield against extremely intense incident heat fluxes. Under similar conditions, the curtain material of this invention has proved entirely effective as a protective shield. As distinguished from the Keithly fabric, my thermal curtain material contains a built-in heat-sink which absorbs heat and serves to retard rise in temperature (and therefore in effect, limit the temperature rise of the fabric under exposure conditions to extremely intense incident radiant flashes).

My invention will now be further described by reference to the accompanying drawing, made a part hereof, wherein each figure is a schematic cross-sectional view through a thermal-barrier curtain material hereof.

As illustrated in FIGURE 1, the thermal-barrier curtain material comprises a visually-exposed, heat-reflective metal film 10 bonded through an intermediate adhesive layer 11 onto a flexible backing 12, with an endothermal layer 13, or heat-sink, firmly bonded to the rear face of backing 12. The variation of this structure illustrated in FIGURE 2 involves a combination of the endothermal and adhesive functions into one layer 14, which serves to bond the visually-exposed heat-reflective metal film 10 to the backing 12, and in addition, serves as a heat-sink in the composite thermal-barrier curtain structure.

Referring again to FIGURE 1, the structure consisting of the visually-exposed metal film 10, bonding adhesive layer 11, and fabric backing 12 may be formed according to the teaching in U.S. Patent 2,703,772 to Keithly; and the disclosure of that patent is accordingly here incorporated by reference. On the rear face of the fabric is coated a binder material containing an endothermal filler adapted to absorb heat from its surroundings in rapidly changing its state at a temperature within the range of about 300° F. or 400° F. to 2000° F. This absorption occurs in a non-violent manner in that it is not an explosive reaction nor one involving combustion. The amount of heat absorption which occurs during change of state of the filler is significantly greater than the normal heat capacity of the filler (i.e., greater than, for example, the normal heat capacity of the filler at temperature gradients below its change of state). In effect, at endothermal change of state, heat absorption of the filler increases above its normal heat capacity (i.e., heat absorption per degree rise in temperature) by a factor of at least 10%, and usually more.

Sheet materials made according to the structure illustrated in FIGURE 1, and having a total thickness on the order of 15 mils, have served as efficient thermal shields to protect against exposure to extraordinarily high-temperature radiant sources on the order of 5000° F. or more for times on the order of 10 seconds or so. Yet the total thickness of the thermal-barrier curtain need not exceed about 10 or 15 mils to provide this extraordinary thermal protection.

In preparing a specific structure according to FIGURE 1 of this invention, a coating of aluminum is first formed, for example, by vapor deposition under high vacuum on a cellulose acetate surfaced carrier web. The aluminum coating is just thick enough to be visibly opaque and continuous, a thickness of about 2 microinches being preferred. (As measured electrically, a coating of such thickness gives a resistivity of about 0.8 ohm per square.) Over this metal coating is then applied a thin coating of a solvent-dispersed heat-curable adhesive composition consisting of about 50 parts by weight of rubbery butadiene acrylonitrile ("Hycar–OR15," a copolymer of 55 parts of butadiene and 45 parts of acrylonitrile), 50 parts of a heat-advancing heat-hardenable phenolaldehyde resin ("Varcum 5476") and 10 parts of dioctylphthalate as a plasticizer. The adhesive composition is dissolved in about 400 parts of methyl isobutyl ketone and the mixture applied at a coating weight sufficient to leave, on evaporation of solvent, a continuous film about 0.001 inch thick (about 4 to 6 grains in weight per 24 square inches of area). Drying of solvent from the film is accomplished in an oven at moderately elevated temperatures up to around 230–250° F. for about 15 minutes.

The adhesively coated film is then brought to (or maintained at) about 240–250° F. by contact of the carrier web with a steam-heated drum, and a thin closely woven glass cloth (a suitable illustrative glass cloth is one weighing about 6.7 ounces per square yard and having a 4-shaft satin weave with 64 threads per inch in warp and about 60 threads per inch in woof or fill) is firmly pressed into contact with the heat-tackified adhesive coating. The composite is then heated at about 250° F. for at least about 4 hours to substantially fully cure the adhesive to a tough, heat and solvent-resistant state, after which the cellulose acetate web may be stripped from the structure.

Next, a series of endothermal coatings are applied to the exposed rear face of the cloth glass backing of the structure.

The first coating is a blend of 67.5 parts of polydiorganosiloxane gum (e.g., silicone gum "GE-53," the majority of the organic groups of which are methyl, with only about 5 to 10% phenyl and about 1% vinyl), 26.25 parts calcium carbonate, 5.25 parts titanium dioxide, 20 parts of minus 325-mesh glass frit softening and proceeding to melt in the range of about 500 to 2000° F., 20 parts of an expandable silicate known as perlite, and 2 parts of benzoyl peroxide (a curing agent for the polydiorganosiloxane gum binder), dispersed in about 190 parts of toluene and 63 parts of xylene. The solvent-dispersed composition is suitably applied by knife coating so as to leave a dry coating weight of approximately 3 ounces per square yard of area, (0.05 ounce per 24 square inches of area) after which the toluene and xylene are evaporated at moderately elevated temperatures of about 180° F., and the polydiorganosiloxane gum cured at 350° F. for about 10 minutes.

A further endothermal coating over that coating first applied is then spread also in a thickness sufficient to give, on evaporation of solvent, approximately 3 ounces per square yard. The second coating consists of about 80.5 parts of the polydiorganosiloxane gum employed in the first coating, 23.75 parts calcium carbonate, 4.65 parts titanium dioxide, 40 parts zirconium silicate, 40 parts expandable silicate known as perlite, and 2.5 parts benzoyl peroxide, dispersed in about 187 parts toluene, and 67 parts xylene. Drying and curing of this second coating is accomplished using the same procedure as with the first coating.

A final coating of about 3 ounces per square yard of area consists of about 68.25 parts of the polydiorganosiloxane gum, 20.6 parts calcium carbonate, 4.15 parts titanium dioxide, 34 parts vermiculite dust, 7.7 parts aluminum powder, and 3.6 parts benzoyl peroxide. The materials of this coating are applied from a dispersion in about 207 parts toluene and 68 parts of xylene. As with the previously applied endothermal coatings, this last coating is dried at a moderately elevated temperature, and then cured by elevating the temperature of the laminate to around 350° F. for 10 minutes. If the cellulose acetate carrier web was not stripped earlier from the structure, it is stripped at this point to leave the curtain material ready for use.

The composite curtain material as described in the foregoing example has a series of separately applied endothermal layers on its back side. The difference between the ranges of temperature at which intense endothermal activity occurs in each of the endothermal layers need not be especially great; but where desired, the temperature range at which the endothermic change in the layer first contacted by thermal energy penetrating the reflective metal face of the structure occurs may be adjusted upwardly so as to effect rapid absorption therein essentially simultaneously with the endothermal change occurring (at respectively lower temperature ranges) in the second and last applied coating. Thus maximum endothermic utilization of heat energy within the fabric may be accomplished in all endothermal layers at about the same time, even though a rather significant gradient of temperature from the front face to the rear surface of the fabric appears evident. In addition, increased absorption of heat energy may be built into the endothermal layer nearest the metallized face as compared to that farthest removed.

In the first layer of the illustrated structure, the combination of calcium carbonate, glass frit, and perlite are primarily responsible for heat absorption by change of state. At approximately 1300° F., calcium carbonate breaks down or dissociates and gives off carbon dioxide with the simultaneous absorption of approximately 770 B.t.u.'s (over and above the amount of heat absorbed at the temperature of change as predicted from the heat capacity of calcium carbonate, assuming no dissociation) per pound of the filler material. This quantity of heat is thereby removed from the surrounding media. Gas given off serves to puff the layer and thereby contribute an insulating effect. The glass frit absorbs substantial quantities of heat during its melting in the range of about 500° F. to 2,000° F. A pariticularly desired function of lower-melting glass frit (e.g., those starting to soften at temperatures below 1000° F.) is that of imparting flame-resistance to the polydiorganosiloxane binder. In the range of about 1300° F. to 1800° F., perlite intumesces, absorbing at least about 55 to 110 B.t.u.'s of heat (over and above its normal heat capacity at change) per pound during the process. Water vapor is thrown off by the perlite in this process, and contributes to expansion or puffing of the silicone resin.

The second coating contains a substantially greater amount of perlite than in the first coating, and in addition, is free of the glass frit. In the third coating a significant quantity of vermiculite dust is included. In the temperature range of 1300° F. to 1800° F., vermiculite dust intumesces with a break down of its crystal structure (and concomitant throwing off of water vapor), absorbing about 90 to 110 B.t.u.'s of heat per pound over and above its normal heat capacity at change.

While I do not wish to be bound by theory, principles aforedelineated may aid in understanding the surprisingly effective performance characteristics of my fabric under exposure to extremely intense incident radiant energy. Confirmation of theoretical considerations, however, is difficult or impossible inasmuch as practical experimentation with the curtain material must be accomplished under such extremely intense temperature conditions that no genuinely accurate methods of temperature measurement, or gradients of temperature, within sections of the fabric, are practical.

From a practical standpoint, it appears that the metalized radiant heat-reflective surface of the fabric structure permits only very low absorption of radiant heat into the fabric. It is extremely unlikely that anything more than about 10% of the incident radiant thermal energy on the face of the fabric is not reflected from the face thereof, although up to about 15–20% may be absorbed in a very limited range of near-visible wave lengths of heat energy. Generally no more than about 3% of the infra-red energy striking the face of the fabric is absorbed. But that some heat energy is absorbed by the fabric is incontrovertible, as evidenced by a rise in temperature in the immediate underlying layers on exposure. Such energy absorbed by the fabric passes by conduction to the endothermal coating lying nearest the reflecting surface, and thereafter, through the first endothermal coating to the second and third coatings.

The curtain structure illustrated in the specific example exhibits approximately twice the heat tolerance of a structure not containing the endothermal filler, but otherwise identical in structure. This is particularly surprising inasmuch as such performance cannot be explained by the endothermal filler content alone. It appears that the combination of layers in the article so function under actual use conditions as to exceed the ordinarily expected heat tolerance of the material. There is evidence that the metallized surface of the structure reaches radiation emitting temperatures under actual intense exposure conditions with resulting substantial emission, even though aluminum is not recognized as a high emitter of radiant energy.

While a series of endothermal coatings are employed in the composite curtain structure illustrated, I have also obtained adequate thermal shielding for extremely intense radiant exposure by applying a single coating of endothermal material instead of a series of coatings. For example, the constituents of the three separately applied coatings aforediscussed may be blended together, dispersed in a mixture of sufficient toluene and xylene to form a coatable mixture, and then coated on the rear face of the glass fabric in sufficient amount to provide a dry coating weight, on evaporation of solvent, on the order of about 9 ounces per square yard. After evaporating the solvent carefully at temperatures up to 200° F., a suitable curring of the polydiorganosiloxane gum binder may be accomplished within about ½ hour at 350° F.

Figure 2:

In forming a structure as illustrated in FIGURE 2, the endothermal filler material may be incorporated within the adhesive used to bond the metal film 10 to the fabric backing 12. For example, ground vermiculite, sodium borate decahydrate, etc., may be incorporated in the butadiene acrylonitrile rubbery adhesive used to bond the metal film to the glass cloth backing. Such a structure, however, is generally less efficient as a thermal protector as compared to the structure illustrated in FIGURE 1, inasmuch as the occurrence of the change in state by the endothermal material immediately beneath the metal film 10 may effect a disruption of the metal film prematurely during an intense incident flash exposure, and thereby prematurely expose portions of the underlying layers of the structure directly to intense radiant energy. However, where vapor deposited metal films are employed as illustrated, gasses generated during endothermal activity in structures such as illustrated in both FIGURES 1 and 2 escape to some extent through the porous vapor-deposited film, contributing to the thermal protective function of the fabric.

By far the most preferred structure of the invention is that illustrated in FIGURE 1, and described in detail above. This structure has functions efficiently as an opaque thermal protector under test conditions (e.g., exposure to 5,000° F. for 10 seconds) which it is believed satisfactorily established that the fabric would operate effectively to shield personnel and equipment from the extremely intense incident heat and light flash of radiation as from an atomic or nuclear blast. Under exposure to a 5000° F. source for about 10 seconds at a close range of only a few feet, only negligible heat energy is transmitted through the fabric to objects therebehind, i.e., the fabric prevents transmission of dangerous levels of thermal energy. This protective result is achieved using the principles of this invention even though the organic portion of the fabric may itself decompose after a period of time of exposure. However, experience has shown that the silicone binder of the fabric aforeillustrated does not appreciably char or decompose during intense incident heat exposures, even though the temperature of the binder momentarily greatly exceeds the temperature at which the binder would be expected to decompose on extended heating. Furthermore, once the fabric has served its purpose as a shield against exposure to an extraordinarily intense heat flux, with reaction of the endothermal fillers triggered, it is not essential that the organic binder of the fabric remain intact. It may be puffed and have a plurality of cells within it as a result of gas evolution (e.g., $CO_2$, $H_2O$ etc.) during endothermal changes. The significant point is that the structure serves to mask out the extremely intense incident heat flux and performs this function for the duration of the flux. No other drapeable fabric is known to be capable of such performance.

It will be appreciated that a variety of binder materials may be filled with endothermal fillers to form the dynamic heat-sink of the structures hereof. A preferred binder is silicone rubber (which may generally be characterized as a polydiorganosiloxane gum wherein a majority of the R groups are lower alkyl groups such as methyl and where not more than about 15% of the R groups are aryl groups such as phenyl, and no more than 1 or 2% of the R groups are unsaturated radicals such as vinyl). The resistance to heat of silicon rubbers is generally recognized to be outstanding as compared to most organic materials currently available on the market.

Flame-resistance of silicone rubbers may further be improved by incorporating therein a glass frit of relatively low softening point such as one starting to soften within the range of approximately 500° F. to 1000° F. An illustrative glass frit to employ is one composed, in weight percent, of 65 $Sb_2O_3$, 19% PbO, 8% $K_2O$, 5% $B_2O_3$, and 3% $SiO_2$. This frit starts to soften at about 700° F. and is a viscous melt at 900° F. In the fabric illustrated, this frit absorbs heat on melting, and then gradually dissipates the absorbed heat on cooling after the intense heat flux has passed. Generally about 30 parts of glass frit for every 100 parts of silicone rubber are sufficient to impart adequate flame-resistance, although up to two or three times this amount may be used satisfactorily. As an incidental matter, it appears that some reaction may take place between the glass frit and silicone during exposure, the glass frit apparently serving as a fluxing agent to prevent disintegration of the coating.

Should endothermal fillers be employed which undergo a change in state at relatively lower temperatures (e.g., a filler such as sodium borate decahydrate, which begins to absorb heat by releasing its water of hydration in a change of state starting at about 220° F.), other organic binder materials may be useful such as, for example, rubbery or flexible bisamide resins, epoxy resin, polyamides, etc. Polyfluorocarbon rubbers may also be useful. It should, however, be recognized that the temperature at which endothermal fillers undergo a change of state may be well in excess of the ignition temperature of the binder material of the endothermal layer without seriously handicapping the operability of the fabric article hereof in its ability to protect against exposure to intense radiant heat. The heat-absorbing behavior of the endothermal layer is so rapid under the conditions of brief exposure to extremely intense incident radiation that ignition of the binder has not been noticed as a problem.

As illustrated, various extenders, pigments, etc., such as, for example, titanium dioxide, zirconium silicate, powdered aluminum, etc., may be blended in an endothermal layer to gain properties as imparted by such additions.

Preferred endothermal constituents for the curtain materials of this invention are water-insoluble inorganic heat-expandable or heat-intumescing materials such as vermiculite, perlite, natural mica and related inorganic complexes. These materials are efficient absorbers of heat, i.e., heat absorbers which undergo a change of state as they remove heat from their surroundings within the sheet material. In the limited temperature range at which change of state occurs, they absorb much greater quantities (e.g., at least 10% or more) of heat per degree rise in temperature than they do at lower temperature ranges. In other words, their endothermal absorption is much greater than their ordinary heat capacity (B.t.u.'s per pound per degree F.). They exhibit desired stability under low temperature conditions up to 300 or 400° F. In a sense, the most efficient absorbers of heat are those which undergo a dissociation (either a molecular split or crystal change) at elevated temperatures in changing state to "captivate" heat and throw off large amounts of volatile decomposition products during the process. The heat required for dissociation of crystallographic water in the form of vapor (e.g., as in the case of mica, vermiculite, perlite, etc.) is an illustration of this process, as is the dissociation of calcium carbonate into $CO_2$ and CaO. Sodium borate decahydrate behaves similarly. Gases so generated not only puff flexible organic binders, but also escape from the endothermal layer carrying heat energy away from it without themselves being at dangerous levels of temperature after traveling a few inches from the layer.

While inorganic materials generally seem to absorb more heat than organic materials during endothermal changes within the temperature range of 300° F. to 2000° F., the essential concepts of the invention are not limited solely to the use of inorganic endothermal materials. In this connection, certain organic materials (e.g., benzene sulfonyl hydrazide) which break down by a process absorbing heat from immediate surroundings may be employed satisfactorily. In many cases, the foam generated by the release of gases during occurrence of the change of state contributes markedly to the insulating properties or heat shielding properties of the construction.

For widest application it is essential that the products of endothermal change be free of toxic components; thus, endothermal filler materials which expand or decompose giving off gases such as water vapor, carbon dioxide or nitrogen, are to be used in preference to materials which give off, for example, chlorine, or some other toxic material.

In preferred structures, the total thickness of the curtain material does not exceed about 30 mils, although structures as thick as 50 or more mils may exhibit satisfactory flexibility and drapeability for limited uses. Structures as thin as 10 mils or slightly less have functioned to give the protection as described. Generally the endothermal layer itself will be at least 5 mils thick up to about 45 mils. While the minimum quantity of endothermal filler material in the layer for effective results is dependent upon the efficiency of the endothermal filler or combination of fillers employed, at least about 2 ounces of active filler per square yard of fabric is considered near the minimal quantity for any reasonably effective performance in the case of most of the useful endothermal fillers. Maximum quantities of endothermal filler are only limited by the requirement of maintaining strength, flexibility and drapeability in the end article.

Thermal-barrier curtain materials of the invention may be formed using various base materials other than those employed in the specific examples hereof. For example, suitable radiant heat-reflective metal faces may be formed using gold, platinum, metal alloys, etc., instead of aluminum. Adhesives to bond the metal reflective film to a backing may be thermoplastic instead of thermosetting. For example, a mixture of polyvinyl butyral plasticized with dioctylphthalate may be employed. Woven backings such as, for example, those of cotton, rayon, nylon, etc., as well as flexible film-type backings may be utilized. By far the most superior thermal protection, however, is afforded by a fabric such as specifically illustrated and described hereinabove in connection with FIGURE 1.

The foregoing non-limitative disclosure is offered to illustrate my invention, as it is further disclosed in the claims appended hereto.

I claim:

1. A heat-shielding flexible and drapeable laminated curtain material comprising a visually-exposed radiant heat-reflective metal film, a fabric backing, and an endothermal layer interposed therebetween, said endothermal layer being between 5 and 45 mils thick and being adapted to absorb heat energy from its surroundings in an amount greater than its normal heat capacity by virtue of its changing of state, in a non-violent manner, at a temperature range within the limits of temperature between 300° F. and 2000° F.

2. A thermal-barrier flexible and drapeable laminate comprising a heat-resistant fabric backing material upon one side of which a visually-exposed radiant heat-reflective metal film is bonded and upon the other side of which an endothermal layer is bonded, said endothermal layer being between 5 and 45 mils thick and containing an endothermic filler adapted to absorb heat energy from its surroundings in an amount greater than its normal heat capacity by virtue of its changing of state, in a non-violent manner, at a temperature range within the limits of temperature between 300° F. and 2000° F.

3. A thermal-barrier flexible and drapeable laminate comprising a plurality of bonded layers including a visually-exposed radiant heat-reflective metal film, an adhesive layer therebeneath and to which said metal film is adhered, a flexible backing adhered to the side of said adhesive layer opposite said metal film, and an endothermal layer adhered to the side of said backing opposite said adhesive layer, said endothermal layer being between 5 and 45 mils thick and containing an endothermic filler adapted to absorb heat energy from its surroundings in an amount greater than its normal heat capacity by virtue of its changing of state, in a non-violent manner, at a temperature range within the limits of temperature between 300° F. and 2000° F.

4. A heat-shielding flexible and drapeable laminated curtain material comprising a visually-exposed radiant heat-reflective metal film adhered to a flexible backing and an endothermal layer bonded therebeneath, said endothermal layer being between 5 and 45 mils thick and comprising a flexible organic binder within which an endothermic inorganic filler is dispersed, said filler being adapted to absorb heat energy from its surroundings in an amount greater than its normal heat capacity by virtue of its changing of state at a temperature range within the limits of temperature between 300° F. and 2000° F.

5. A heat-shielding flexible and drapeable laminated curtain material comprising a visually-exposed radiant heat-reflective metal film adhered to a flexible backing and an endothermal layer bonded therebeneath, said endothermal layer being between 5 and 45 mils thick and being triggered into endothermal absorption of heat at elevated temperatures between 300° F. and 2000° F., and comprising a flexible organic binder within which is dispersed a finely divided heat-intumescing filler which absorbs heat during intumescence.

6. A heat-shielding flexible and drapeable laminated curtain material comprising a visually-exposed radiant heat-reflective metal film adhered to a flexible backing and an endothermal layer bonded therebeneath, said endothermal layer being between 5 and 45 mils thick and comprising a flexible organic adhesive binder within which is dispersed a finely divided endothermic filler adapted to non-combustibly dissociate into a solid material and a gaseous material at elevated temperatures and thereby absorb heat from its surroundings during said dissociation.

7. A heat-shielding flexible and drapeable laminated curtain material comprising a visually-exposed radiant heat-reflective metal film adhered to a flexible backing and an endothermal layer bonded therebeneath, said endothermal layer being between 5 and 45 mils thick and comprising a flexible organic binder within which is dispersed an endothermic inorganic filler, said filler including an expandable silicate adapted to absorb energy from its surroundings in an amount greater than its normal heat capacity by virtue of its changing of state, in a non-violent manner, at a temperature range within the limits of temperature between 300° F. and 2,000° F.

8. A heat-shielding flexible and drapeable laminated curtain material comprising a visually-exposed radiant heat-reflective metal film, an endothermal layer to which said metal film is adhered, and an underlying flexible backing, said endothermal layer being between 5 and 45 mils thick and comprising a flexible organic binder within which is dispersed an endothermal inorganic filler, said filler including an expandable silicate adapted to absorb energy from its surroundings in an amount greater than its normal heat capacity by virtue of its changing of state, in a non-violent manner, at a temperature range within the limits of temperature between 300° F. and 2,000° F.

9. A heat-shielding flexible and drapeable laminated curtain material comprising a visually-exposed radiant heat-reflective vapor-deposited metal film, a flexible backing to which said metal film is firmly bonded, and an endothermal layer bonded to said backing on the side thereof opposite said metal film, said endothermal layer being between 5 and 30 mils thick and comprising a flexible silicone binder within which is dispersed an endothermic inorganic filler, said filler including an expandable silicate adapted to absorb energy from its surroundings in an amount greater than its normal heat capacity by virtue of its changing of state, in a non-violent manner, at a temperature range within the limits of temperature between 300° F. and 2,000° F.

10. A heat-shielding flexible and drapeable laminated curtain material comprising a visually-exposed radiant heat-reflective vapor-deposited metal film, an endothermal layer to which said metal film is adhered, and an underlying flexible backing bonded to said endothermal layer, said endothermal layer being between 5 and 30 mils thick and comprising a flexible silicone binder within which is dispersed an endothermal inorganic filler, said filler including an expandable silicate adapted to absorb energy from its surroundings in an amount greater than its normal heat capacity by virtue of its changing of state, in a non-violent manner, at a temperature range within the limits of temperature between 300° F. and 2,000° F.

References Cited in the file of this patent

UNITED STATES PATENTS

| | | |
|---|---|---|
| 2,385,500 | Fasold et al. | Sept. 25, 1945 |
| 2,460,795 | Warrick | Feb. 1, 1949 |
| 2,656,295 | Locke | Oct. 20, 1953 |
| 2,703,772 | Keithly | Mar. 8, 1955 |
| 2,732,318 | Keil | Jan. 24, 1956 |
| 2,744,878 | Smith-Johannsen | May 8, 1956 |
| 2,891,033 | Savage | June 16, 1959 |
| 2,912,392 | Stilbert et al. | Nov. 10, 1959 |
| 2,938,937 | Shenk | May 31, 1960 |